2,749,332
METALLIFEROUS AZO-DYESTUFFS

Arthur Buehler, Rheinfelden, and Christian Zickendraht, Binningen, Switzerland, assignors to Ciba Limited, Basel, Switzerland, a Swiss firm No Drawing. Application August 15, 1952, Serial No. 304,630

Claims priority, application Switzerland August 17, 1951

13 Claims. (Cl. 260—145)

According to this invention valuable new metalliferous azo dyestuffs are made by treating a monoazo-dyestuff free from sulfonic acid and carboxylic acid groups and corresponding to the general formula
(1)

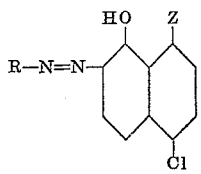

in which R represents a 1-hydroxybenzene radical bound to the azo-linkage in 2-position and containing a sulfonic acid amide group in one of the positions 5 and 6, and Z represents a hydrogen or chlorine atom, with an agent yielding cobalt, or advantageously an agent yielding chromium, in such manner that the resulting dyestuff contains less than one atom of cobalt or chromium in complex union per molecule of monoazo-dyestuff.

The monoazo-dyestuffs of the above formula used as starting materials in the present process can be made by coupling a diazotized 2-amino-1-hydroxybenzene-5- or -6-sulfonic acid amide free from sulfonic acid and carboxylic acid groups with 5-chloro-1-hydroxynaphthalene or 5:8-dichloro-1-hydroxynaphthalene.

As 2-amino-1-hydroxybenzene-5- or -6-sulfonic acid amides there come into consideration for making the dyestuffs serving as starting materials in the present process those which contain a substituted, advantageously an alkylated, and above all a monoalkylated or an unsubstituted sulfonic acid amide group and of which the benzene nucleus may contain, in addition to the sulfonic acid amide, hydroxyl and amino groups, further substituents incapable of salt formation, that is to say, substituents not imparting solubility in water, such as halogen atoms (for example, chlorine), alkyl groups (for example, methyl), alkoxy groups (for example, methoxy), nitro groups, —CO-alkyl groups (for example, —CO—CH₃) and acylamino groups (for example, acetylamino). Especially valuable are 4-chloro- or 4-methoxy-2-amino-1-hydroxybenzene-5-sulfonic acid amide, 4-nitro- or 4-chloro-2-amino-1-hydroxybenzene-6-sulfonic acid amide, 4-nitro-2-amino-1-hydroxybenzene-6-sulfonic acid methylamide or phenylamide, 4-chloro-2-amino-1-hydroxybenzene-5-sulfonic acid methylamide or phenylamide, and especially 2-amino-1-hydroxybenzene-5-sulfonic acid amide and the corresponding N-methyl-, N-ethyl-, N-isopropyl-, N-butyl-, N-β-hydroxyethyl-, N-β-methoxyethyl-, N-β-chlorethyl-, N-benzyl-, N-cyclohexyl-, N-phenyl-, N-ethylphenyl-, N-dimethyl-, N-diethyl- or N-di(hydroxyethyl)-amide or pyrolidide.

The coupling of the diazotized 2-amino-1-hydroxybenzene-5- or -6-sulfonic acid amide with 5-chloro-1-hydroxynaphthalene or with 5:8-dichloro-1-hydroxynaphthalene can be carried out by the usual known methods, for example, in an alkaline medium.

When the coupling reaction is complete the dyestuffs, for the purpose of metallization, can easily be separated from the coupling mixture by filtration, if desired with the addition of sodium chloride, as they are only slightly soluble in water. They are advantageously used for metallization in the form of filter cakes without intermediate drying. In some cases it is also possible to carry out the metallization directly in the coupling mixture without intermediate separation.

The monoazo-dyestuffs serving as starting materials in the present process and obtainable as described above in general dissolve sufficiently well in water in the form of their alkali compounds to enable them to be used for dyeing from dyebaths which require no addition of acid, for example, by the single-bath chroming process.

The treatment with an agent yielding cobalt or chromium is carried out in accordance with the present process in such manner that a metalliferous dyestuff is obtained which contains less than one atom of cobalt or chromium in complex union per molecule of monoazo-dyestuff. Accordingly, the metallization is advantageously carried out with such agents yielding cobalt or chromium and by such methods that complex metal compounds of this constitution are obtained. In general it is desirable to use a quantity of an agent yielding cobalt or chromium which contains less than one atomic proportion of cobalt or chromium per molecular proportion of monoazo-dyestuff and/or to conduct the metallization in a weakly acid to alkaline medium. Accordingly, those agents yielding cobalt or chromium are especially suitable for the present process which are stable in alkaline media such, for example, as chromium compounds of aliphatic hydroxycarboxylic acids or dicarboxylic acids or advantageously aromatic orthohydroxy-carboxylic acids, which contain the chromium in complex union. As examples of aliphatic hydroxycarboxylic acids or dicarboxylic acids there may be mentioned among others oxalic acid, lactic acid, glycollic acid, citric acid and especially tartaric acid, and among the aromatic ortho-hydroxy-dicarboxylic acids there may be mentioned, for example, those of the benzene series such as 4- or 5- or 6-methyl-1-hydroxybenzene-2-carboxylic acid and above all 1-hydroxybenzene-2-carboxylic acid itself. As agents yielding cobalt there are advantageously used simple compounds of divalent cobalt such as cobalt sulfate or cobalt acetate and if desired cobalt hydroxide.

The conversion of the dyestuffs into the complex cobalt or chromium compounds is advantageously carried out at a raised temperature, under atmospheric or superatmospheric pressure, for example, at the boiling temperature of the reaction mixture, if desired in the presence of suitable additions, for example, in the presence of salts of organic acids, bases, organic solvents or other agents assisting the formation of complexes. Especially valuable are the chromium complexes so obtained.

In a special form of the process a mixture of different metallizable monoazo-dyestuffs free from sulfonic acid and carboxylic acid groups is used as starting material, which dyestuffs correspond to the above general formula or one of which corresponds to that formula and the other corresponds to the formula (2)

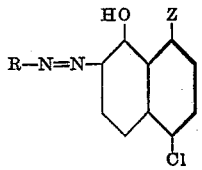

or the formula (3)

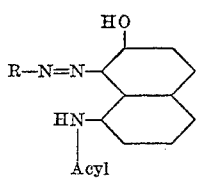

in which Z represents a hydrogen or chlorine atom, and R represents a benzene residue containing a hydroxyl group in ortho-position relatively to the azo-linkage.

The monoazo-dyestuffs corresponding to the Formula 2 or 3, which are used in admixture with the monoazo-dyestuffs of the Formula 1 as starting materials for the present process, can be made by coupling an ortho-hydroxy-diazo compound of the benzene series free from sulfonic acid and carboxylic acid groups with 5-chloro-1-hydroxynaphthalene or 5:8-dichloro-1-hydroxynaphthalene or a 1-acyl-amino-7-hydroxynaphthalene, especially 1-benzoylamino, 1-n-butyrylamino or 1-acetylamino-7-hydroxynaphthalene. As ortho-hydroxy-diazo-compounds there are advantageously used diazo compounds of those ortho-hydroxyamines of the benzene series which contain in the benzene nucleus, in addition to the hydroxyl and amino groups, further substituents such as halogen atoms (for example, chlorine) alkyl groups (for example, methyl), alkoxy groups (for example, methoxy), nitro group, —CO-alkyl groups (for example, —CO—CH$_3$), acylamino groups (for example, acetylamino), and also sulfonic acid amide groups, advantageously a sulfonic acid amide group of the formula —SO$_2$NHC$_{n-1}$H$_{2n-1}$ in para-position relatively to the hydroxyl group, in which formula $n$ represents a whole number not greater than 7. Valuable results are obtained with the following ortho-hydroxyamines:

4-methyl-2-amino-1-hydroxybenzene, 4-methoxy-2-amino-1-hydroxybenzene, 4-chloro-2-amino-1-hydroxybenzene, 4:6-dinitro- or 4:6-dichloro-2-amino-1-hydroxybenzene, 4-nitro-2-amino-1-hydroxybenzene, 5-nitro-2-amino-1-hydroxybenzene, 6-nitro-4-methyl-2-amino-1-hydroxybenzene, 6-acetylamino-4-chloro-2-amino-1-hydroxybenzene, 5-nitro-4-chloro-2-amino-1-hydroxybenzene, 4-nitro-6-chloro-2-amino-1-hydroxybenzene, 6-nitro-4-chloro-2-amino-1-hydroxybenzene, 4-nitro-6-acetylamino-2-amino-1-hydroxybenzene, 6-nitro-4-acetylamino-2-amino-1-hydroxybenzene, 3-amino-4-hydroxyacetophenone, 5-nitro-3-amino-4-hydroxyacetophenone, 2-amino-1-hydroxybenzene-4-carboxylic acid amide, and also 6-nitro- or 6-chloro-2-amino-1-hydroxybenzene-4-sulfonic acid amide, 4-nitro-2-amino-1-hydroxybenzene-6-sulfonic acid amide, 2-amino-1-hydroxybenzene-4-sulfonic acid amide, 2-amino-1-hydroxybenzene-4-sulfonic acid-N-methyl-, -N-ethyl-, -N-isopropyl, -N-n-butyl-, -N-β-hydroxyethyl- or β-chloroethylamide and the 2-amino-1-hydroxybenzene-5- or -6-sulfonic acid amides mentioned above.

In this form of the process the treatment with the agent yielding metal is of course carried out so that the resulting metalliferous dyestuff contains less than one atom of metal in complex union per molecule of monoazo-dyestuff.

The especially valuable chromiferous dyestuffs obtainable by the present process can also be made by a somewhat more complicated method, in which a chromium compound of a monoazo-dyestuff containing one atom of chromium in complex union per molecule of monoazo-dyestuff (1:1 complex) is reacted with a metal-free monoazo-dyestuff, and in which the starting materials are so chosen that the metal free and chromiferous monoazo-dyestuffs (1:1-complex) are free from sulfonic acid and carboxylic acid groups and both of which correspond to the general Formula 1 or one of them corresponds to that formula and the other to the Formula 2 or 3.

The chromiferous 1:1-complexes serving as starting materials in this modified form of the process can be made by the usual known methods, for example, by reacting a monoazo-dyestuff free from complex-forming metal in an acid medium with an excess of a salt of trivalent chromium, for example, chromium fluoride or chromium sulfate, at the boiling temperature or if desired at a temperature above 100° C. and in the presence of a solvent such as alcohol. As starting material there may be used an ortho:ortho'-dihydroxy-monoazo-dyestuff of the above constitution or a corresponding ortho-alkoxy-ortho'-hydroxy-monoazo-dyestuff.

The reaction of the resulting 1:1-complexes with the metal-free dyestuffs is advantageously carried out by working in an aqueous neutral to alkaline medium at the ordinary or a raised temperature.

In order to obtain by the modified process the 1:2-complexes especially distinguished by their good solubility, it is in general desirable to react approximately equimolecular proportions of the chromiferous dyestuff (1:1-complex) and the metal-free monoazo-dyestuff.

In a further form of the process a mixture of an agent yielding cobalt and an agent yielding chromium is used.

The products obtainable by the processes described above are new. They are cobalt or chromium compounds, which contain the same or different monoazo-dyestuffs in a complex in which the ratio of the number of cobalt or chromium atoms bound in complex union to the number of monoazo-dyestuff molecules bound in complex union to the cobalt or chromium is smaller than 1:1, and advantageously about 1:2, and in which the monoazo-dyestuffs present are orth:ortho'-dihydroxy-monoazo-dyestuffs free from sulfonic acid and carboxylic acid groups, each of which corresponds to the Formula 1 or one of which corresponds to that formula and another corresponds to the general Formula 2 or 3. Specially valuable are the complexes in which two identical monoazo-dyestuffs of the Formula 1 are bound in complex union to one atom of cobalt or chromium.

The new cobaltiferous or chromiferous dyestuffs are soluble in water and in weakly acid aqueous media, and are indeed more soluble than the metal-free parent dyestuffs used for making them. They are suitable for dyeing or printing a very wide variety of materials, above all for dyeing animal materials such as silk, leather, and especially wool, but also for dyeing or printing synthetic fibers of superpolyamides or superpolyurethanes. As compared with the chromium compounds of dyestuffs containing sulfonic acid groups, which it is of advantage to use for dyeing from strongly acid, for example, sulfuric acid baths, the new metal compounds, especially the chromium compounds of monoazo-dyestuffs free from sulfonic acid groups, are especially suitable for dyeing from weakly alkaline or neutral to weakly acid, advantageously acetic acid, baths. There may of course be added to the dyebaths, the assistants customarily used in wool dyeing, such as sodium sulfate, sodium pyrophosphate, ethylene oxide condensation products, etc. The wool dyeings so obtained are distinguished by their level character, good fastness to decatizing and carbonizing, very good properties of wet fastness, for example, a very good fastness to washing and fulling, and a very good fastness to light.

The following examples illustrate the invention, the parts and percentages being by weight unless otherwise stated and the relationship of parts by weight to parts by volume being the same as that of the kilogram to the liter:

*Example 1*

18.8 parts of 2-amino-1-hydroxybenzene-5-sulfonic acid amide are suspended in 200 parts of water and 15 parts of 10 N-hydrochloric acid, and diazotized at 0–5° C. with 25 parts by volume of a 4 N-solution of sodium nitrite. The diazo solution is neutralized by the addition of sodium carbonate and run into a solution, cooled to 0° C. with ice, of 21.3 parts of 5:8-dichloro-1-hydroxynaphthalene, 4 parts of sodium hydroxide and 5.3 parts of sodium carbonate in 200 parts of water. When the coupling has finished the completely precipitated dyestuff is filtered off. When dry it is a black-violet powder which dissolves in water with a violet coloration, in dilute sodium hydroxide solution with a bluish red coloration and in concentrated sulfuric acid with a pure green coloration.

20.6 parts of the dyestuff so obtained are dissolved in the form of the moist filter cake in 500 parts of water at 80° C. with the addition of 4 parts of sodium hydroxide, and mixed with 50 parts of a cobalt sulfate solution having a cobalt content of 3.25 per cent. After stirring for about ½ hour at 70–80° C., the metallization is finished. The resulting violet dyestuff solution is filtered, if necessary, to remove impurities, and then evaporated to dryness. The dyestuff is a violet powder which dissolves in water with a blue-violet coloration, in dilute sodium hydroxide solution with a blue red coloration and in concentrated sulfuric acid with a pure green coloration, and dyes wool from a weakly alkaline or neutral or acetic acid bath pure violet tints of excellent fastness to washing, decatizing and carbonizing. It is the cobaltiferous compound containing one atom of cobalt bound in complex union with substantially two molecules of the monoazo-dyestuff of the formula

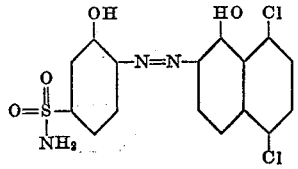

*Example 2*

20.6 parts of the dyestuff obtained as described in the first paragraph of Example 1 are dissolved in 300 parts of water with the addition of 4 parts of sodium hydroxide, and then mixed with 60 parts of a solution of sodium-potassium chromosalicylate having a chromium content of 2.6 per cent. The chroming mixture is stirred for about 5 hours at the boiling temperature; at the end of this period the chroming is finished. By neutralization with dilute acetic acid and by the addition of sodium chloride the chromium complex so formed, which is the chromiferous compound containing one atom of chromium bound in complex union with substantially two molecules of the monoazo-dyestuff of the formula

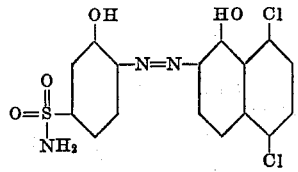

is completely precipitated and filtered off. When dry it is a blue black powder which dissolves in water and in dilute sodium hydroxide solution with a blue coloration and in concentrated sulfuric acid with an olive coloration, and dyes wool from a weakly alkaline or neutral or acetic acid bath full blue tints of good fastness to light and excellent properties of wet fastness and fastness to carbonizing and decatizing.

The dark green solution of sodium-potassium chromosalicylate is obtained by boiling 362 parts of an aqueous chromic sulfate solution having a chromium content of 7.2 per cent. with 138 parts of salicylic acid, dissolving the resulting chromosalicylic acid by the addition of 166 parts of sodium hydroxide solution of 40 per cent. strength and a sufficient quantity of potassium hydroxide solution of 37 per cent. strength to render the reaction distinctly alkaline to phenolphthalein, and making up the mixture to 1000 parts with water.

*Example 3*

21.8 parts of 4-methoxy-2-amino-1-hydroxylbenzene-5-sulfonic acid amide are diazotized in the usual manner in the presence of 16 parts of hydrochloric acid of 30 per cent. strength and 7 parts of sodium nitrite. The resulting suspension of the diazo compound is poured, while stirring well into a solution, cooled to 10° C., of 22.6 parts of 5:8 - dichloro - 1 - hydroxynaphthalene, 9.6 parts of sodium hydroxide and 200 parts of water. The coupling mixture is stirred for 20 hours at room temperature and the precipitated dyestuff is filtered off. The filter residue is dissolved in dilute sodium hydroxide solution at 50° C., the solution is filtered to remove any impurities, and the dyestuff is precipitated from the filtrate by neutralization with dilute hydrochloric acid and filtered off. When dry it is a dark colored substance which dissolves in dilute sodium hydroxide solution with a red-violet coloration and in concentrated sulfuric acid with a blue green coloration, and dyes wool from an acetic acid bath red-violet tints.

The dyestuff obtained in the manner described above is dissolved in 500 parts of hot water with the addition of 6 parts of sodium hydroxide. After the addition of 140 parts of a solution of sodium-potassium chromosalicylate having a chromium content of 2.6 per cent., the chroming mixture is boiled for one hour under reflux. The chrominum complex so formed, which is the chromiferous compound containing one atom of chromium bound in complex union with substantially two molecules of the monoazo-dyestuff of the formula

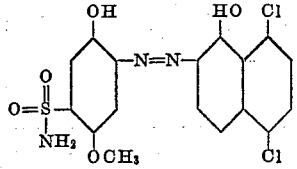

is precipitated by the addition of sodium chloride. In the dry state it is a dark colored substance which dissolves in dilute sodium hydroxide solution with a blue coloration and in concentrated sulfuric acid with a green coloration and dyes wool from a weakly alkaline, neutral or acetic acid bath blue tints of good fastness to light and excellent properties of wet fastness and fastness to carbonizing and decatizing.

In the following table are given the properties of further metal complexes which can be obtained by the processes described in the foregoing axamples. In columns (a) and (b) are given the tints of the dyeings obtained on wool or fibers of superpolyamides with the cobalt and chromium complexes, respectively, of the dyestuffs obtained from the components given in columns I and II:

| I<br>Diazo component | II<br>Azo component | a<br>Co complex | b<br>Cr complex |
| --- | --- | --- | --- |
| 1. 2-amino-1-hydroxybenzene-5-sulfonic acid-N-isopropylamide. | 5:8-dichloro-1-hydroxynaphthalene. | violet | blue. |
| 2. 4-chloro-2-amino-1-hydroxybenzene-5-sulfonic acid amide. | do | do | Do. |
| 3. do | 5-chloro-1-hydroxynapthalene. | do | grey. |
| 4. 4-chloro-2-amino-1-hydroxybenzene-6-sulfonic acid amide. | 5:8-dichloro-1-hydroxynaphthalene. | grey having a violet shade. | |
| 5. do | 5-chloro-1-hydroxynaphtalene. | violet | bluish violet. |

*Example 4*

41.2 parts of the dyestuff obtained as described in the first paragraph of Example 1 and 36.6 parts of the dyestuff obtained in known manner from diazotized 4-chloro-2-amino-1-hydroxybenzene and 5:8-dichloro-1-hydroxynaphthalene are suspended in 3000 parts of water, and mixed with 220 parts of a solution of sodium chromo-salicylate having a chromium content of 2.6 per cent. After boiling under reflux for 6 hours the chroming is finished. The resulting chromium compound is precipitated by the addition of sodium chloride and filtered off. When dry, it is a black powder which dissolves in water with a blue coloration and in concentrated sulfuric acid with an olive-black coloration, and dyes wool from a neutral or acetic acid bath full blue tints of excellent fastness properties.

For making the corresponding cobalt compound the above mentioned mixture of dyestuffs is dissolved in 2000 parts of water at 80° C. with the addition of 16 parts of sodium hydroxide and mixed with 200 parts of a cobalt sulfate solution having a cobalt content of 3.25 per cent. After stirring for about ½ hour at 80° C., the metallization is finished. The resulting cobalt complex is precipitated by the addition of sodium chloride and acetic acid. When dry it is a violet powder which dissolves in water with a blue-violet coloration and in concentrated sulfuric acid with a grey-blue coloration, and dyes wool from a weakly alkaline, neutral or acetic acid bath violet tints.

In the following table are given the properties of further mixed metal complexes which are obtained by the processes described in the foregoing example. In columns (a) and (b) are given the tints of the dyeings obtainable on wool or fibers of superpolyamides with the chromium mixed complexes or cobalt mixed complexes, respectively, of the dyestuffs given in columns I and II:

| | I | II | a<br>Cr complex | b<br>Co complex |
|---|---|---|---|---|
| 1 | 4-chloro-2-amino-1-hydroxybenzene-5-sulfonic acid amide ⟶ 5:8-dichloro-1-hydroxynaphthalene. | 4-chloro-2-amino-1-hydroxybenzene ⟶ 5:8-dichloro-1-hydroxynaphthalene. | blue having a violet shade. | violet. |
| 2 | 2-amino-1-hydroxybenzene-5-sulfonic acid amide ⟶ 5:8-dichloro-1-hydroxynaphthalene. | 2-amino-1-hydroxybenzene-4-sulfonic acid-methylamide ⟶ 1-acetylamino-7-hydroxynaphthalene. | blue | grey having a violet shade. |
| 3 | do | 6-acetylamino-4-nitro-2-amino-1-hydroxybenzene ⟶ 1-acetylamino-7-hydroxynaphthalene. | greenish grey. | violet. |
| 4 | do | 6-nitro-4-acetylamino-2-amino-1-hydroxybenzene ⟶ 1-acetylamino-7-hydroxynaphthalene. | blue | blue-violet. |
| 5 | do | 5-nitro-2-amino-1-hydroxybenzene ⟶ 1-acetylamino-7-hydroxynaphthalene. | grey blue | violet. |

*Example 5*

100 parts of well wetted wool are entered at 40–50° C. into a dyebath which contains, in 4000 parts of water, 1 part of the cobaltiferous dyestuff obtainable as described in the first and second paragraphs of Examples 1 and 10 parts of crystalline sodium sulfate. 3 parts of acetic acid of 40 per cent strength are added, the bath is raised to the boil in the course of ½ hour and dyeing is carried on at the boil for ¾ hour. Finally the wool is rinsed with cold water and dried. There is obtained a pure violet dyeing of good fastness to washing, decatizing and carbonizing.

The same result is obtained when the dyebath contains no addition of acetic acid.

A pure violet dyeing is also obtained by using, instead of 100 parts of wool, 100 parts of superpolyamide fibers (nylon fibers) in this example.

What is claimed is:

1. A metalliferous compound containing two monoazo-dyestuffs so bound in complex union with a metal selected from the group consisting of cobalt and chromium that the proportion of the number of metal atoms in complex union to the number of monoazo-dyestuff molecules is substantially 1:2, in which metalliferous compound one of the monoazo-dyestuffs present corresponds to the formula

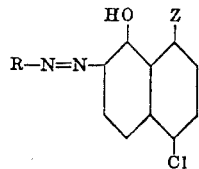

wherein R represents a 1-hydroxybenzene radical bound to the azo linkage in 2-position, free from sulfonic and carboxylic acid groups and containing a sulfonic acid amide group in one of the positions 5 and 6, and Z represents a member selected from the group consisting of a hydrogen and a chlorine atom, the other monoazo-dyestuff present in the metalliferous compound being a member selected from the group consisting of a monoazo-dyestuff of the aforesaid formula, a monoazo-dyestuff of the formula

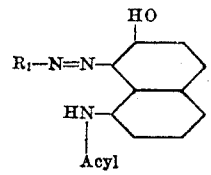

and a monoazo-dyestuff of the formula

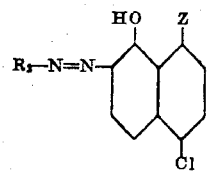

wherein $R_1$ and $R_2$ each represents a benzene radical free from sulfonic and carboxylic acid groups and containing a hydroxyl group in ortho-position relatively to the azo linkage, and Z represents a member selected from the group consisting of a hydrogen and a chlorine atom.

2. A chromiferous compound containing two monoazo-dyestuffs so bound in complex union with chromium that the number of chromium atoms in complex union to the number of monoazo-dyestuff molecules is substantially 1:2, in which chromiferous compound one of the monoazo-dyestuffs present corresponds to the formula

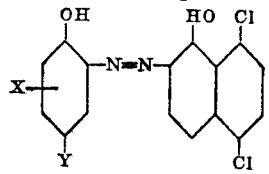

wherein Y represents a member selected from the group consisting of a hydrogen atom, a chlorine atom and an alkoxy group of low molecular weight, and X represents a sulfonic acid amide group the nitrogen atom of which carries a substituent of the formula $C_{n-1}H_{2n-1}$, in which $n$ is a whole number up to 4, the other monoazo-dyestuff present in the chromiferous compound corresponding to the formula

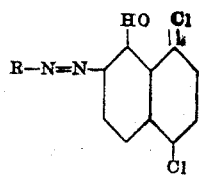

wherein R represents a benzene radical free from sulfonic and carboxylic acid groups and containing a hydroxyl group in ortho position relatively to the azo-linkage.

3. A cobaltiferous compound containing two monoazo-dyestuffs so bound in complex union with cobalt that the number of cobalt atoms in complex union to the number of monoazo-dyestuff molecules is substantially 1:2, in which cobaltiferous compound one of the monoazo-dyestuffs present corresponds to the formula

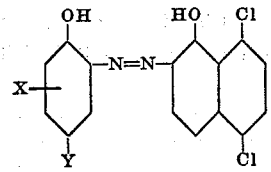

wherein Y represents a member selected from the group consisting of a hydrogen atom, a chlorine atom and an alkoxy group of low molecular weight, and X represents a sulfonic acid amide group the nitrogen atom of which carries a substituent of the formula $C_{n-1}H_{2n-1}$, in which $n$ is a whole number up to 4, the other monoazo-dyestuff present in the cobaltiferous compound corresponding to the formula

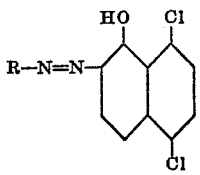

wherein R represents a benzene radical free from sulfonic and carboxylic acid groups and containing a hydroxyl group in ortho-position relatively to the azo-linkage.

4. A chromiferous compound containing two monoazo-dyestuffs so bound in complex union with chromium that the number of chromium atoms in complex union to the number of monoazo-dyestuff molecules is substantially 1:2, in which chromiferous compound both monoazo-dyestuffs present correspond to the formula

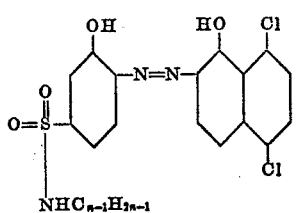

wherein $n$ is a whole number up to 4.

5. A chromiferous compound containing two monoazo-dyestuffs so bound in complex union with chromium that the number of chromium atoms in complex union to the number of monoazo-dyestuff molecules is substantially 1:2, in which chromiferous compound both monoazo-dyestuffs present correspond to the formula

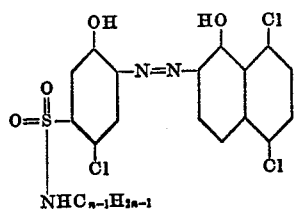

wherein $n$ is a whole number up to 4.

6. A chromiferous compound containing two monoazo-dyestuffs so bound in complex union with chromium that the number of chromium atoms in complex union to the number of monoazo-dyestuff molecules is substantially 1:2, in which chromiferous compound both monoazo-dyestuffs present correspond to the formula

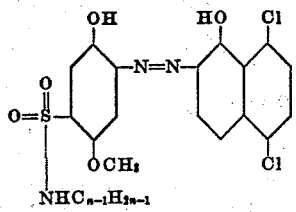

7. A cobaltiferous compound containing two monoazo-dyestuffs so bound in complex union with cobalt that the number of cobalt atoms in complex union to the number of monoazo-dyestuff molecules is substantially 1:2, in which cobaltiferous compound both monoazo-dyestuffs present correspond to the formula

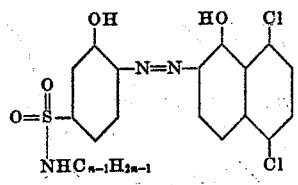

wherein $n$ is a whole number up to 4.

8. A chromiferous compound containing two monoazo-dyestuffs so bound in complex union with chromium that the number of chromium atoms in complex union to the number of monoazo-dyestuff molecules is substantially 1:2, in which chromiferous compound one of the monoazo dyestuffs present corresponds to the formula

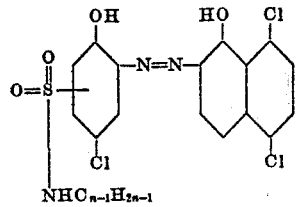

wherein $n$ is a whole number up to 4, and the other monoazo-dyestuff present in the complex compound corresponds to the formula

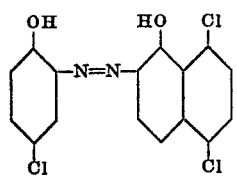

9. The chromiferous compound containing one atom of chromium bound in complex union to substantially two molecules of the monoazo-dyestuff of the formula

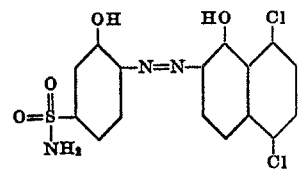

10. The chromiferous compound containing one atom of chromium bound in complex union to substantially two molecules of the monoazo-dyestuff of the formula

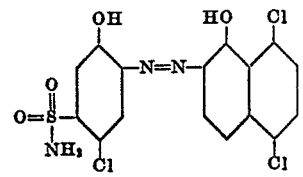

11. The chromiferous compound containing one atom of chromium bound in complex union to substantially two molecules of the monoazo-dyestuff of the formula

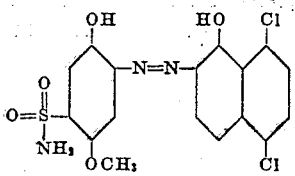

12. The chromiferous compound containing one atom of chromium in complex union with substantially two molecules of monoazo-dyestuffs one of which corresponds to the formula

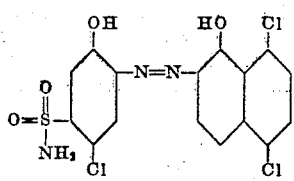

and the other corresponds to the formula

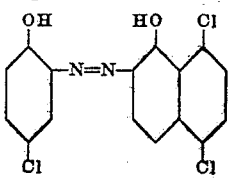

13. The cobaltiferous compound containing one atom of cobalt bound in complex union to substantially two molecules of the monoazo-dyestuff of the formula

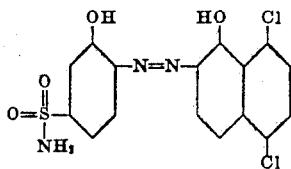

References Cited in the file of this patent
UNITED STATES PATENTS

| | | |
|---|---|---|
| 2,109,806 | Straub et al. | Mar. 1, 1938 |
| 2,396,327 | Kvalnes et al. | Mar. 12, 1946 |
| 2,447,164 | Conzetti | Aug. 17, 1948 |
| 2,597,676 | Schetty | May 20, 1952 |
| 2,610,175 | Widmer et al. | Sept. 9, 1952 |